(No Model.) 2 Sheets—Sheet 1.
R. S. WARING.
MANDREL FOR CABLE PRESSES.
No. 294,537. Patented Mar. 4, 1884.
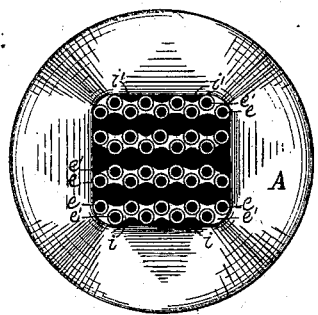
Fig. 1.
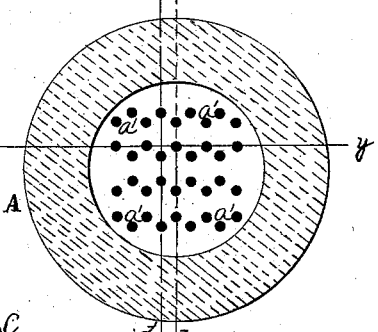
Fig. 2.
Fig. 3.
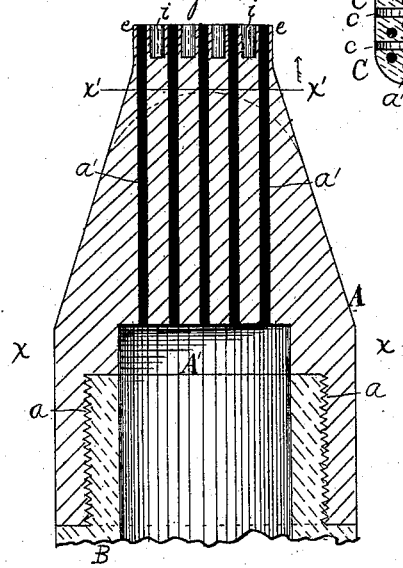
Fig. 4.
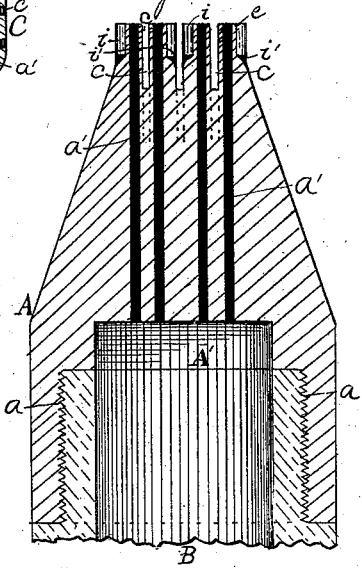
Fig. 5.
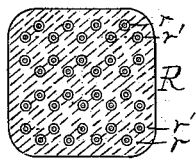
Fig. 7.
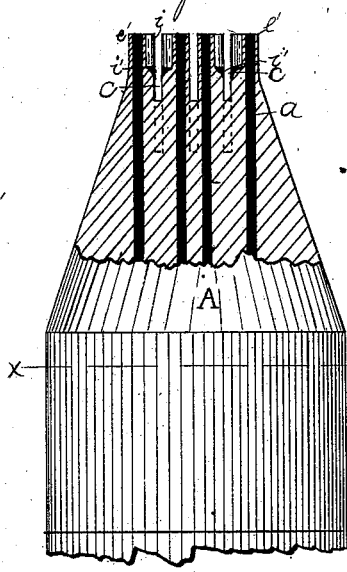
Fig. 6.
Witnesses
C. L. Parker
R. H. Whittlesey
Inventor
Richard S. Waring
by George H. Christy
His Attorney (No Model.) 2 Sheets—Sheet 2.

R. S. WARING.
MANDREL FOR CABLE PRESSES.

No. 294,537. Patented Mar. 4, 1884.

Witnesses
C. L. Parker
R. H. Whittlesey

Inventor
Richard S. Waring
by George H. Christy
His Attorney

UNITED STATES PATENT OFFICE.

RICHARD S. WARING, OF PITTSBURG, PENNSYLVANIA.

MANDREL FOR CABLE-PRESSES.

SPECIFICATION forming part of Letters Patent No. 294,537, dated March 4, 1884.

Application filed July 20, 1883. (No model.)

*To all whom it may concern:*

Be it known that I, RICHARD S. WARING, a citizen of the United States, residing at Pittsburg, county of Allegheny, State of Pennsylvania, have invented or discovered a new and useful Improvement in Mandrels for Cable-Presses; and I do hereby declare the following to be a full, clear, concise, and exact description thereof, reference being had to the accompanying drawings, making a part of this specification, in which—like letters indicating like parts—

Figure 8:
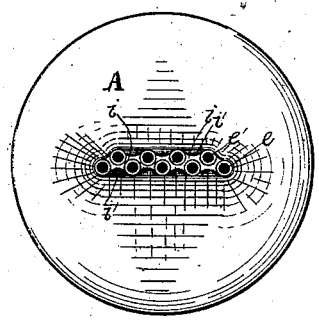
Figure 9:
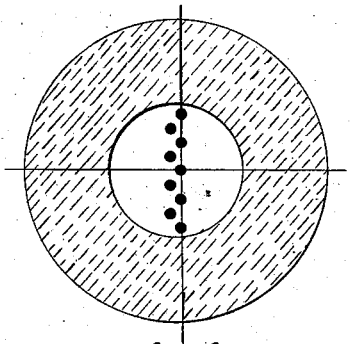
Figure 10:
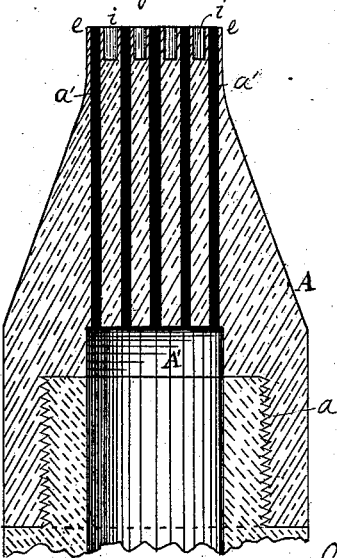
Figure 11:
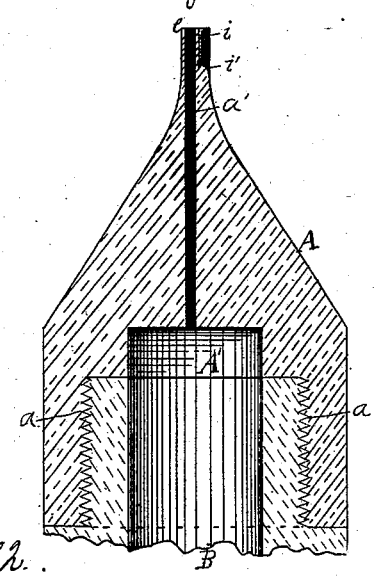
Figure 13:
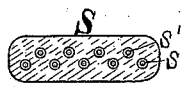
Figure 12:
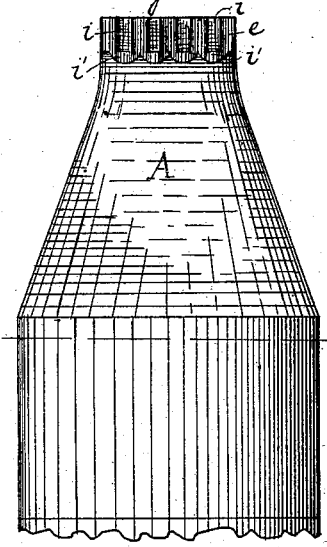

Figure 1, Sheet 1, is an end view of my improved mandrel or core, looking upon the points of the nipples. Fig. 2 is a transverse sectional view taken in the plane of the line $x\ x$, Fig. 6, looking toward the point or nipples. Fig. 3 is a similar view taken in the plane of the line $x'\ x'$, Fig. 4, looking away from the nipples or point. Figs. 4 and 5 are longitudinal sectional views taken in the planes of the lines $y\ y$ and $z\ z$, respectively, Fig. 2. Fig. 6 is a view in sectional elevation, the plane of section being indicated by the line $z'\ z'$. Fig. 7 is a transverse sectional view of the cable made by the form of mandrel shown on Sheet 1. Figs. 8, 9, 10, and 11, Sheet 2, are views similar to Figs. 1, 2, 4, and 5, respectively, but showing the invention applied to a mandrel for making a cable, Fig. 13, containing but a portion of the wires of one made by the mandrel shown on Sheet 1; and Fig. 12 is a view in side elevation of the mandrel illustrated in the other figures of Sheet 2.

My present invention relates to certain improvements in the core or mandrel employed in a lead-press for making compound lead-covered electric cables; and, in general terms, it consists of a mandrel having on its point or core end tubular nipples arranged in one or more pairs of rows, the two rows of a pair being in close proximity, with provision for passing lead between pairs of rows and between adjacent nipples in the several rows, as hereinafter more fully described and claimed.

I have illustrated my invention embodied in mandrels of two different forms adapted to form two cables, one as in Sheet 2, containing a single pair of rows of wires, and the other, as in Sheet 1, containing four such pairs. When the wires of a cable are few in number and arranged in a single row, or in similar simple order, no special difficulty is encountered in covering the same with lead in a lead-press, even when such wires are in close proximity; but cables of the class referred to are often required in the art, containing a large number of wires; also, economy in the use of lead and other requirements of commercial success make it important that such cables should be as small in sectional area and as light as may be. The difficulties heretofore encountered in securing a continuous, unbroken body of lead between contiguous wires have prevented close grouping of wires, and consequently have necessitated the construction of large and heavy cables and the use of large amounts of lead in such construction. These have proved serious hinderances to the successful manufacture and use of large cables, and my invention is designed more particularly to overcome these and other like difficulties.

My improved mandrel is constructed as follows: A body of metal, A, of iron or steel, is tapered toward one end, forming the point of the mandrel. A threaded socket, $a$, is formed in the base end for attachment to the threaded end of tubular core-bar B, or other equivalent tubular support, which, with the socket in mandrel A, incloses a chamber or enlarged passage, A'. Through the body of the mandrel are formed a number of holes, $a'$, through which the wires are passed. In drilling these holes they may be arranged in any desired order of distribution at the base end, opening into chamber A'; but they are given such directions that at the point they emerge in the order of one or more pairs of rows corresponding to the arrangement of wires $s\ s'$ in cable S, Fig. 13, or of wires $r\ r'$ in cable R, Fig. 7. In order to form tubular nipples or pipe-like extensions $e\ e'$, through which the wire-passages emerge, grooves $c$ (see Figs. 3, 5, and 6) are cut in the point between successive pairs of rows, thus dividing the point of the mandrel into two or more parallel lands or sections, C, each perforated with two lines or rows of wire-passages. The grooves $c$ may be of any desired depth, by preference somewhat greater than the length of nipples to be made, and the bases of these cuts or grooves may be rounded or inclined from the center toward either side, so as to facilitate entry or flow of lead into the same. In the metal thus divided or separated are formed the nipples $e\ e'$, by turning or otherwise cutting away a portion of such metal, leaving comparatively thin pipe-like or cylindrical projections, forming extensions of the wire-passages, with open spaces $i$, Figs. 4 and 9, between the several extensions or nipples thus formed. The depth of these cuts or spaces $i$ is, by preference, about one-quarter inch and about one-half the depth of grooves $c$. (See Fig. 5.)

In operation, lead, in its passage under pressure out of the cylinder of the press, enters and fills the grooves $c$, passing downward therein to the die-opening. In passing the nipples $e\ e'$, these streams of flowing lead pass or expand laterally into the spaces $i$ immediately surrounding the nipples; and such supply, coming from both sides of each pair of rows, unites around the nipples under the pressure to which the lead is exposed, and so passing downward off the points of the nipples envelop the several wires within the passages formed in the lead body by the nipples, which latter, in their function of forming passages, operate substantially like the core of an ordinary pipe-press. In order to facilitate the lateral flow of lead from the grooves $c$ into the spaces $i$ surrounding the nipples, the shoulders $i'$ (see Figs. 5 and 6) are beveled or countersunk, provision being made for this in the arrangement of the nipples, as presently described. By making the nipples $e\ e'$ comparatively short, requisite strength is secured with comparatively light walls, and by making the grooves $c$ deeper than the nipples provision is made for obtaining a full, unbroken stream or supply of lead in such grooves, from which the lead spreads throughout all the spaces $i$, surrounding each and all the nipples under substantially the same conditions.

The arrangement of the wire-inclosing nipples is also an important feature in this connection. As shown in the drawings, this arrangement is in pairs of rows, the nipples $e$ representing or constituting one row of each pair and the nipples $e'$ the other row of the pair. These two rows constituting a pair are in close proximity, and the nipples $e$ of one pair alternate in position with or occur about midway of the intervals between the nipples $e'$ of the companion row; also, adjacent nipples in each row—that is, successive nipples $e\ e$ or $e'\ e'$—are separated by greater intervals than adjacent nipples $e\ e'$, measured across the rows. These features of arrangement afford comparatively wide openings (see Fig. 1) for lead to enter the spaces $i$ from the grooves or channels $c$, and also expose the greater part of the nipple-surfaces to the direct flow of lead from these channels. In this manner the wires may be grouped compactly in pairs of rows in the cable, and at the same time provision is made for distributing the lead-supply uniformly throughout the entire group before it reaches the points where it envelops the wires by direct contact therewith. This feature of forming channels for lead passage at intervals through the body of the mandrel, in order to distribute the lead-supply before it reaches the nipples proper, is of special importance and advantage where more than one pair of rows of nipples are required, as represented on Sheet 1. By means of this provision lead is applied to each successive pair of rows of nipples, be they more or less, under substantially uniform conditions throughout, such conditions being also substantially the same where a single pair of rows is employed, as represented on Sheet 2. In this form of mandrel the grooves $c$ of Sheet 1 are not used, because not needed, the flow of lead along the outer tapered surface of the mandrel affording uniform supply to all the spaces $i$ surrounding the nipples. In other respects the principles of construction and arrangement involved in the mandrel having the single pair, Sheet 2, and that having more than one pair, Sheet 1, are substantially the same; and to this extent I include both forms of mandrel within my present invention. Another feature in the arrangement of nipples, relating more particularly to mandrels containing two or more pairs of rows, is the order of succession of rows. (See Fig. 1.) As there shown, the adjacent rows of any two successive pairs have the same number and order of position of nipples—or, in other words, rows containing an even number of nipples are immediately succeeded in the next pair by a similar row, and likewise the rows containing an odd number are similarly succeeded, whereby a regular surface outline is secured for the cable, and also the nipples of two adjoining pairs of rows are naturally grouped into approximately circular arrangement of six nipples in each such group. This arrangement not only facilitates access to the spaces between nipples to countersink the shoulders $i'$, as above described, and to do other like work in construction and fitting, but also more open or unobstructed passages are secured for flow of lead, both toward the nipple-points and laterally into the spaces immediately surrounding the nipples.

I make no claim herein to the form and construction of cable made by means of the mandrel above described, such cables being included in the subject-matter of other applications for patents filed even date herewith.

I claim herein as my invention—

1. A mandrel, A, for a cable-press, having at its point a series of nipples, $e\ e'$, arranged in one or more pairs of rows, the nipples in one row of such pair or pairs alternating in order of succession with the nipples in the other or companion row of the pair, substantially as set forth.

2. A mandrel, A, having its nipples $e\ e'$ arranged in one or more pairs of rows, the successive nipples in each row being separated a greater distance than adjacent nipples in a pair taken across the rows, substantially as set forth.

3. A mandrel, A, for a cable-press, having thereon tubular nipples e e', arranged in pairs of rows, the two rows of a pair being in closer proximity than the adjacent rows of successive pairs, substantially as set forth.

4. A mandrel for a cable-press, having nipples thereon arranged in pairs of rows, the nipples in the two rows composing a pair alternating in order of succession, and the nipples in adjacent rows of successive pairs corresponding to each other in order of position, substantially as set forth.

5. A mandrel for a cable-press, having nipples e e' thereon, such nipples being arranged in pairs of rows, with the nipples in the two rows of a pair alternating in order of succession, and the two rows of a pair being in closer proximity than the adjacent rows of successive pairs, substantially as set forth.

6. A mandrel, A, for a cable-press, having groups of tubular nipples thereon, with grooves or channels c crossing the mandrel between groups, such grooves or channels being of greater depth than the nipples, substantially as set forth.

7. A mandrel, A, having nipples e e' thereon, arranged in pairs of rows, with channels c of greater depth than the nipples formed in the mandrel-body between pairs of rows, substantially as set forth.

8. A mandrel, A, having separate wire-passages a' therethrough, such passages emerging at the point in two or more distinct groups, with grooves or channels c formed in the body of the mandrel across the point between groups of wire-passages, substantially as set forth.

In testimony whereof I have hereunto set my hand.

RICHARD S. WARING.

Witnesses:
R. H. WHITTLESEY,
C. L. PARKER.